US005939571A

United States Patent [19]

Foidl

[11] Patent Number: 5,939,571

[45] Date of Patent: Aug. 17, 1999

[54] DEVICE AND PROCESS FOR THE PRODUCTION OF OILS OR OTHER EXTRACTABLE SUBSTANCES

[75] Inventor: Nikolaus Foidl, Graz, Austria

[73] Assignee: Sucher & Holzer Bauplanungs —und, Graz, Austria

[21] Appl. No.: 08/945,444

[22] PCT Filed: Apr. 26, 1996

[86] PCT No.: PCT/AT96/00083

§ 371 Date: Oct. 27, 1997

§ 102(e) Date: Oct. 27, 1997

[87] PCT Pub. No.: WO96/33861

PCT Pub. Date: Oct. 31, 1996

[30] Foreign Application Priority Data

Apr. 27, 1995 [AT] Austria ...................................... 726/95
Apr. 27, 1995 [AT] Austria ...................................... 727/95

[51] Int. Cl.[6] ................................ C11B 1/06; C12J 1/10; A23L 1/20

[52] U.S. Cl. ................................ 554/12; 554/11; 554/9; 426/17; 426/29

[58] Field of Search ................................ 554/12, 11, 9; 426/17, 29

[56] References Cited

U.S. PATENT DOCUMENTS

| | | | |
|---|---|---|---|
| 2,184,248 | 12/1939 | Bonotto . | |
| 4,024,168 | 5/1977 | Homann et al. . | |
| 4,675,133 | 6/1987 | Eggers et al. | 260/412.2 |
| 5,041,245 | 8/1991 | Benado | 260/412.1 |
| 5,077,071 | 12/1991 | Strop . | |

FOREIGN PATENT DOCUMENTS

| | | |
|---|---|---|
| 3 97966 | 7/1988 | European Pat. Off. . |
| 386222 | 7/1988 | European Pat. Off. . |
| 3866222 | 7/1988 | European Pat. Off. . |
| 3 88743 | 8/1989 | European Pat. Off. . |
| 3 94374 | 3/1992 | European Pat. Off. . |
| 394374 | 3/1992 | European Pat. Off. . |
| 397966 | 8/1994 | European Pat. Off. . |
| 665873 | 10/1938 | Germany . |
| 3016877 A1 | 11/1981 | Germany . |
| 918438 | 3/1961 | United Kingdom . |
| 1340484 | 12/1973 | United Kingdom . |
| 2078542 | 1/1982 | United Kingdom . |
| 92 00268 | 1/1992 | WIPO . |
| 9200268 | 1/1992 | WIPO . |
| 93 09212 | 5/1993 | WIPO . |
| 9309212 | 5/1993 | WIPO . |

*Primary Examiner*—Paul J. Killos
*Assistant Examiner*—J. Parsa
*Attorney, Agent, or Firm*—Birch, Stewart, Kolasch & Birch, LLP

[57] ABSTRACT

A device for the production of oils by pressing and extracting a raw material containing oleiferous or extractable substances in the presence of a liquid or supercritical extraction agent. The device includes an inlet for said raw material, a substantially cylindrical pressing body having outlets for oils and being connected to said inlet, and a press screw movably provided in said cylindrical pressing body whereby said raw material is transported from said inlet into said pressing body and therefrom to a discharge outlet while being pressed. In addition, the pressing body is proof-sealed against its surroundings by a jacket and the press screw and/or the pressing body include outlets wherethrough a liquid extraction agent may be introduced into said raw material present in said pressing body. At the outlet of said pressing body, a pipe permitting degassing of the press cake discharged from the press by applying a vacuum, thus removing the solvent from it, may be provided.

9 Claims, 2 Drawing Sheets

DEVICE AND PROCESS FOR THE PRODUCTION OF OILS OR OTHER EXTRACTABLE SUBSTANCES

BACKGROUND OF THE INVENTION

1. Field of the Invention

The invention is concerned with a device, namely a screw press, for the production of oils by pressing and extracting an oleiferous raw material in the presence of a liquid extraction agent. The device includes an inlet for the raw material, a substantially cylindrical pressing body having outlets for oil and being connected to the inlet, and a press screw movably provided in the cylindrical pressing body. The press srew transports the raw material from the inlet into the pressing body and therefrom to a discharge outlet while pressing it.

For the purposes of the present specification and claims, the terms "oil" and "oleiferous" also refer to "fat" and "fatty" as well as to "extractable substances".

2. Description of Related Art

From DE-A-30 16 877, a process for the continuous separation of fat from organic raw materials is known wherein the raw materials are first shredded and optionally dried, then mashed using a fat dissolving agent and thereafter fed to a screw press.

Also, GB-A-1 340 484 is concerned with pressing in the presence of an extraction agent.

DE-C 665 873 refers to a process according to which an extraction agent is fed during pressing.

According to the process known from GB-A-1 340 484, palm oil may be produced by pressing the oleiferous fruit while adding a solvent to the material to be pressed under normal pressure at the intake of the press.

All known screw presses whereby oil is produced have the disadvantage in that their oil yields are not satisfactory.

Thus it is the object of the present invention to provide a screw press whereby the oleiferous raw material may be deoiled to an extent of 96–98%, based on the total oil content, in one single operation step.

BRIEF SUMMARY OF THE INVENTION

The device according to the invention for the present production of oil by pressing and extracting an oleiferous raw material in the presence of a liquid extraction agent, comprises an inlet for the raw material, a substantially cylindrical pressing body having outlets for oil and being connected to the inlet, and a press screw movably provided in the cylindrical pressing body. The press screw transports the raw material from the inlet into the pressing body and therefrom to a discharge outlet while pressing it wherein

- said pressing body is pressure-sealed against its surroundings by means of a jacket and
- said press screw and/or said pressing body comprise outlets wherethrough a liquid extraction agent may be introduced under pressure into the raw material present present invention consists essentially of the jacket comprising at its lower.

A convenient embodiment of the device according to the present invention consists essentially of the jacket comprising at its lower portion a tub for collecting the oil/extraction agent mixture being discharged from the pressing body.

The tub is suitably provided with an outlet for the oil/extraction agent mixture, said outlet having a gasproof connection to a pressure vessel.

The invention is also concerned with a process for the production of oils and/or extractable substances by pressing and extracting oleiferous and/or extractable substances-containing raw material in the presence of a liquid and/or a supercritical extraction agent, an oil or extracted substance/extraction agent mixture being obtained wherefrom the extraction agent is removed, wherein the raw material is shredded and pressed using the above-described device according to the invention while the extraction agent is simultaneously introduced under pressure into the raw material.

Using the device according to the invention, carbon dioxide in liquefied state and/or supercritical state and/or hydrocarbons in liquid and/or supercritical state are particularly useful as the liquid extraction agent.

It has proven advantageous to treat the shredded raw material with an oil-dissolving liquid prior to pressing. Thus the oil layer surrounding the shredded raw material particles is removed, whereby friction between the particles during pressing is increased and a very good build-up of pressure in the pressing body as well as a very good sealing of the pressing body towards its upstream end are achieved.

Further, the device according to the invention is appropriate for carrying out transesterification processes. Thus for instance it is possible to transesterify triglycerides contained in the oleiferous raw material with an alcohol, thus producing fatty acid alkyl ester. Therefore the invention is also concerned with the use of the device according to the invention for the production of fatty acid esters by transesterification of a triglyceride contained in the oleiferous raw material with an alcohol in the presence of a catalyst, said use being characterized in that

- said triglyceride-containing raw material is shredded,
- the shredded raw material is introduced into a pressing body,
- alcohol and a catalyst are introduced into the raw material through the outlets provided in the press screw and/or in the pressing body under such conditions that the triglyceride contained in the raw material is transesterified with the alcohol, thus fatty acid ester being produced which is discharged from the pressing body through the outlets, whereafter
- the fatty acid ester is purified in a known manner.

Transesterification means the reaction of triglycerides, i.e. vegetable and animal fats and oils, with alcohols such as methanol, ethanol, butanol and isopropanol, particularly methanol and ethanol, thus producing the monoesters of fatty acids and glycerine. Fatty acid methyl esters are of increasing importance as a substitute for diesel fuel.

From AT-B 394 374, a transesterification process is known. According to this process, an excess of 1.10 to 1.80 mol of the alcohol employed per mol of fatty acid transesterified with glycerine is used. From AT-B 388 743 a process for the production of a fatty acid mixture of waste fats or oils and the use of this mixture as fuel is known.

Also AT-B 397 966 describes the production of fatty acid esters of low monovalent alcohols by transesterification of, e.g., rapeseed oil. According to this process, transesterification is carried out in the presence of a solid basic catalyst at a catalyst excess of not more than 1.6 mol per mol of fatty acid bound as glyceride.

From AT-B 397 510 a two or multi-step transesterification process is known.

As the catalysts for transesterification, usually basic catalysts such als alkali hydroxides, metal hydrides, alcoholates, carbonates or acetates and acid catalysts such as mineral acids are used. The catalysts most frequently used are sodium and potassium hydroxide as well as sodium methylate which dissolved in alcohol are added e.g. to a vegetable oil. Such a process is known from AT-B 386 222.

The known transesterification starts with a diphase system of triglyceride and alcohol containing the catalyst. While the reaction proceeds and ester is produced, a homogeneous phase forms which again turns biphase when glycerine is produced and discharged (raw ester phase and glycerine phase).

The use according to the invention of the transesterification device according to the invention is based on the finding that, among other reasons, transesterification may be advantageously carried out in the oleiferous raw material itself, i.e. that it is not necessary to first produce the oil to be transesterified from the raw material and then transesterify it. Thus transesterification and separation of the fatty acid alkyl ester may be carried out in one single step.

It is evident to those skilled in the art that when the pressing device is used according to the invention, first a biphase mixture consisting substantially of ester and glycerine will be obtained and the production of pure ester from this biphase mixture is possible using known techniques.

A preferred use of the press according to the invention is characterized in that when starting, pressing an agent which binds the residual humidity of the oil or fat-containing substance is introduced into the oleiferous substance, thus preventing an increased saponification after adding the catalyst.

Conveniently, pressing is carried out while cooling.

By means of the attached drawing, the invention is illustrated in more detail.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENTS

Figure 1:
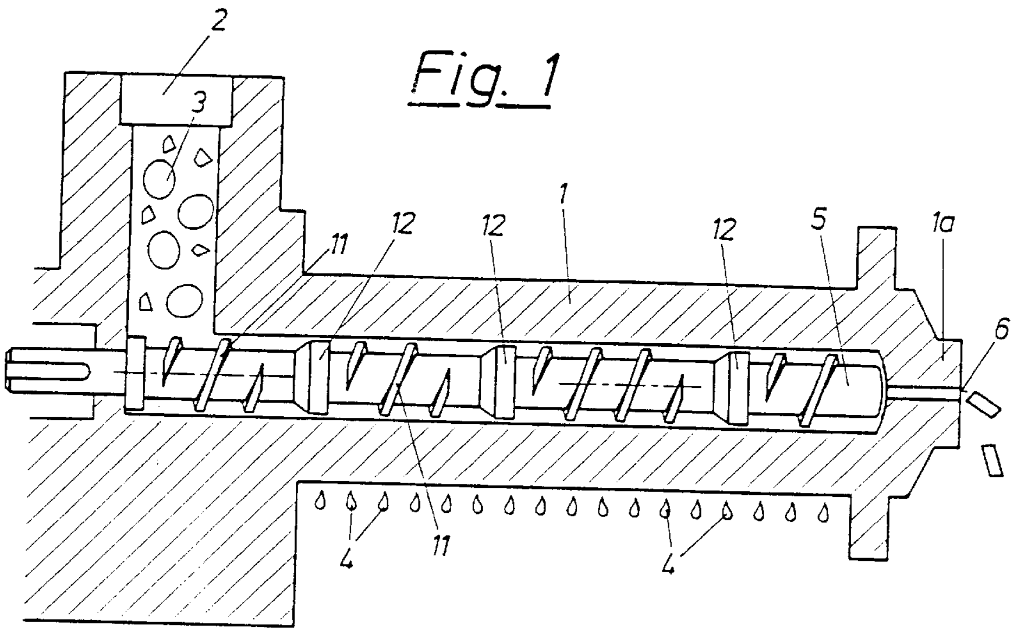
FIG. 1 shows a section through a screw press of the prior art.

FIG. 1 schematically shows a section through a known screw press (made by the company Krupp). Reference number 1 refers to a cylindrical pressing body connected to an inlet 2 for the raw material 3 to be pressed and extracted. The raw material 3 is seized by spirals 11, pressed into cylindrical pressing body 1, and transported through. Oil is pressed from the raw material which flows downwards through outlets usually including straining rods (not shown) and is discharged from pressing body 1. The oil being discharged from pressing body 1 is indicated by means of drops 4. The oil is collected in a tub (not shown).

After being transported through pressing body 1, the raw material pressed is discharged by discharge outlet 6 provided in a component la joined to the cylindrical pressing body 1.

In the embodiment shown, press screw 5 has three frustoconical taperings 12 whereat the material to be pressed is subjected to an increased pressure. After overcoming such a tapering, the pressure naturally will drop somewhat again. Such a change of pressure favors pressing, and solvent injected at this point will diffuse down to the level of the cell wall due to this short-time drop in pressure.

Figure 2:
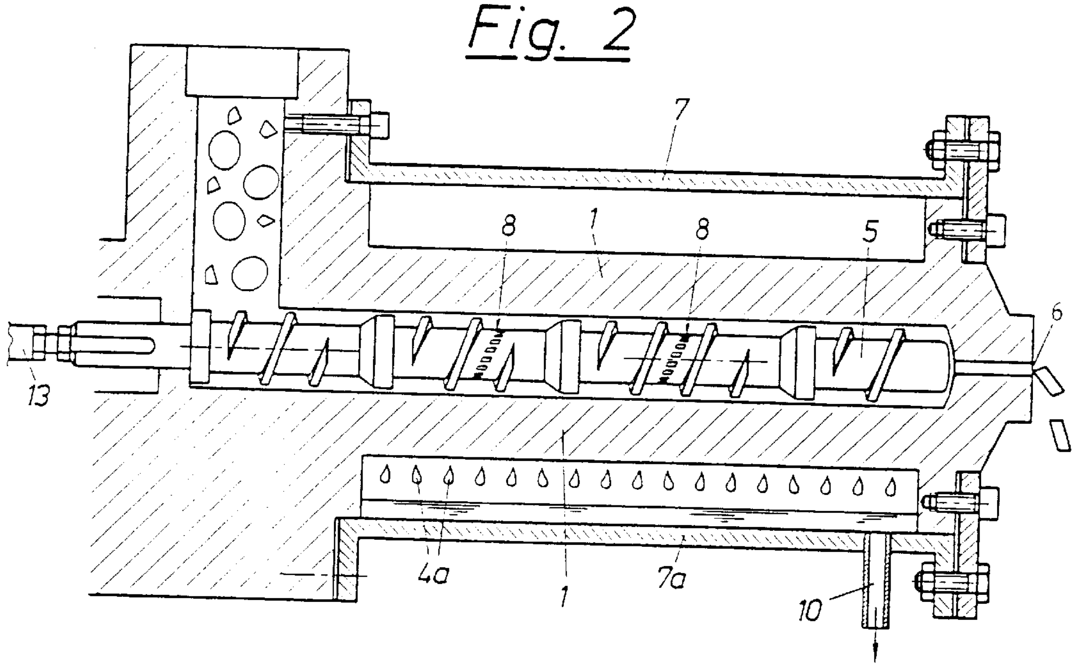
FIGS. 2 and 3 show advantageous embodiments of the screw press according to the invention.

FIG. 2 shows a section through an embodiment of a screw press according to the invention which can be easily obtained by adapting the known screw press shown in FIG. 1. Additionally, the screw press according to the invention shown comprises a jacket 7, 7*a* which proof-seals pressing body 1 in the portion of those outlets (not shown) wherefrom oil 4 is discharged into tub 7*a*, which in the present case is identical with the lower portion of jacket 7, against its surroundings.

Press screw 5 is hollow and comprises outlets 8 wherethrough a liquid extraction agent may be introduced under pressure into the raw material present in pressing body 1. The extraction agent is fed under pressure to the hollow press screw 5 through feeding 13. It has been shown that pressing of the raw material carried out in this way while simultaneously feeding an extraction agent under pressure gives a very high oil yield of at least 96%, based on the total oil content. Due to the high pressures in the material to be pressed, the solvent injected enters a supercritical state, and the solubility of the oil or the extractable substances increases in the solvent.

Reference number 4*a* indicates the mixture of oil and extraction agent discharged out of the pressing body 1 in the area of the straining rods (not shown) which is collected in tub 7*a,* in the present embodiment formed by the lower portion of jacket 7, and enters a receptacle (not shown) through gasproof outlet 10. The oil or the extractable substance may be produced in a known manner by removing the extraction agent from the mixture oil or extractable substance/extraction agent.

When a hydrocarbon which under normal conditions is liquid is used as an extraction agent, it may be separated by distillation.

When a hydrocarbon which under normal conditions is gaseous or $CO_2$ is used as an extraction agent, it is conducted under pressure and therefore in liquid or supercritical state from the press into a pressure vessel. Therefrom it may be reconducted from the liquid to the press again in liquid or supercritical state by evaporation or suction and subsequent pressure increase and temperature reduction while pressure is lowered (regeneration and recirculation).

Moreover, it has been shown that in the device according to the invention liquid carbon dioxide is very useful as an extraction agent. It is evident to those skilled in the art that in this case such pressure/temperature conditions must be applied whereunder carbon dioxide is present in liquid state or in supercritical state. This applies to feeding 13 and in hollow press screw 5 as well as during pressing of the raw material, i.e. within pressing body 1, within tub 7*a,* within outlet 10 and within the subsequent receptacle, which in this case must be provided as a pressure vessel. By setting such pressure and temperature conditions, a liquid mixture of oil or extractable substances and carbon dioxide is present in tub 7*a*. Carbon dioxide may be removed from the mixture by evaporation by means of a simple pressure reduction.

Figure 3:
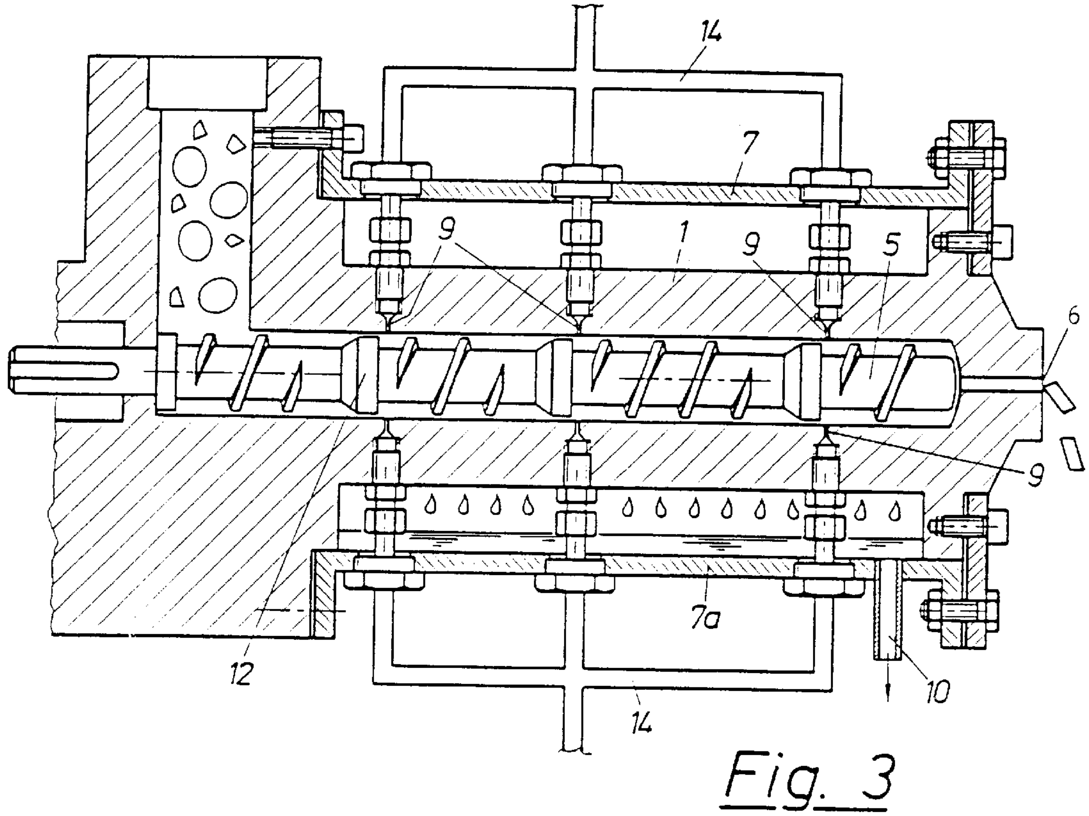

FIG. 3 shows another preferred embodiment of the device according to the invention wherein the extraction agent, i.e.

liquid hydrocarbon or liquid carbon dioxide, is not introduced by means of press screw 5 but by means of pressing body 1 into the raw material which has just been processed. These outlets are referred to by reference number 9. The extraction agent is fed to outlets 9 by means of feedings 14.

Conveniently, outlets 9 are each provided immediately after a tapering 12 of press screw 5. This improves the production of oil to a significant degree.

Shortly before the material to be pressed is discharged from the press, a flush nozzle (not shown) may be provided wherethrough acids and/or oil-displacing and/or oil-soluble substances may be additionally injected.

Figure 4:
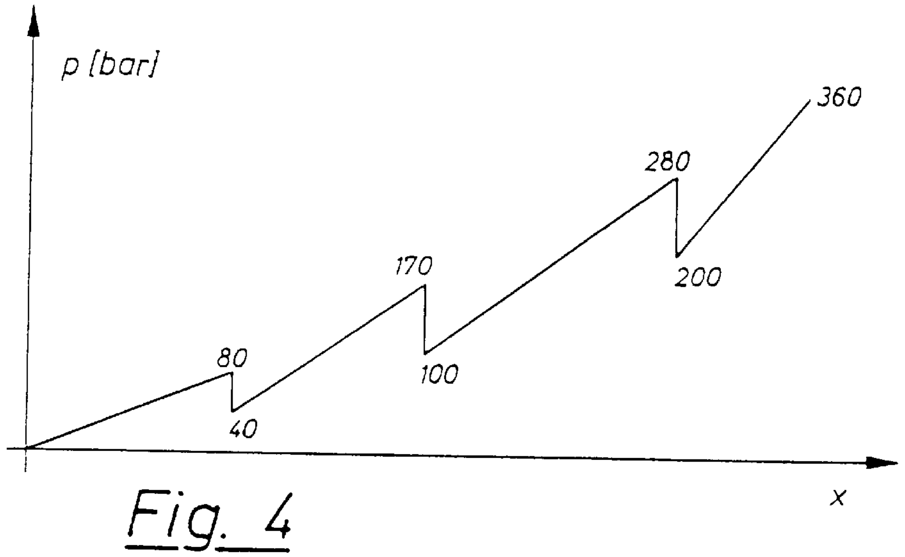
FIG. 4 shows the pressure course along the pressing body of the screw press according to the invention.

FIG. 4 shows the pressure course in pressing body 1, the X-axis indicating the length of the cylindrical pressing body and the ordinate indicating the pressure. From FIG. 4 it can be seen that the pressure increases when screw 5 seizes the material to be pressed and transports it into pressing body 1. For a good build-up of pressure it is important that the oil layer is superficially removed from the shredded raw material by washing it with extraction agent. In FIG. 4, exemplary pressures are indicated.

First, pressure in pressing body 1 continuously rises until the first tapering 12 is overcome, whereafter pressure drops sharply to afterwards rise again continuously until the next tapering 12. By this pressure change, the oil production is improved, i.e. the particles to be pressed are reoriented.

In the following, a preferred embodiment of the process according to the invention for the production of oil will be described in more detail.

Before processing, non-oleiferous deads are removed from the raw material and the raw material is decorticated (depeeled). Then it is dried to a water content of about 2–5%.

After drying, the oleiferous raw material is shredded to a particle size of 0.5–2 mm. Thereafter it is washed with an oil-dissolving liquid such as hexane and/or an acid. The humid raw material thus prepared can be fed to the press.

By completely separating the peel from the raw material, it is possible to increase the pressing capacity up to 40% compared to the known processes. Moreover, due to this separation the protein content of the press cake is increased by the portion of the removed peel.

(When the press cake is discharged from the press, the extraction agent content is from 4–8%. This is significantly less than in the processes known today.

At discharge outlet 6, the device according to the invention permits the discharged material to be pressed to be conducted in warm state into a pipe (not shown) provided with suction outlets so as to recover the solvent discharged after reducing pressure by means of suction and condensation. Due to this possibility, the energy demand for removing the residual solvent is significantly lowered, since the heat of the material to be pressed is used for evaporating the solvent.

As already mentioned above, the device according to the invention may also be used to catalytically transesterify triglycerides in the raw material during pressing. For that purpose, a mixture of alcohol and catalyst is introduced into the raw material instead of the extraction agent through outlets 8 and 9 respectively. In this case, liquid 4 and 4*a* respectively which is discharged from pressing body 1 is a mixture of ester, glycerine, alcohol and catalyst, wherefrom ester may be produced in a known manner.

For transesterification, the shredded raw material should not contain more than 0.5% of water. Conveniently, the raw material to be processed is contacted already prior to pressing with the alcohol/catalyst mixture for 20–30 minutes.

The use according to the invention of the screw press according to the invention allows transesterification degrees exceeding 99% to be achieved.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

I claim:

1. A device for the production of oils or other extractable substances by pressing and extracting a raw material of plant origin containing oleiferous or extractable substances in the presence of a liquid extraction agent, said device comprising:

an inlet for said raw material;

a pressing body wherein a movable press screw is provided;

means for introducing said extraction agent into said pressing body;

a discharge outlet for said raw material pressed;

said movable press screw is a single press screw arranged in said pressing body for transporting said raw material from said inlet into said pressing body and therefrom to said discharge outlet while pressing said raw material under simultaneous introduction of said extraction agent into said raw material subjected to pressing; and said pressing body is proof-sealed against its surroundings by means of a jacket.

2. The device according to claim 1, wherein said means for introducing said extraction agent into said pressing body are outlets provided in said press screw, wherethrough a liquid extraction agent may be introduced under pressure into said raw material present in said pressing body.

3. The device according to claim 1 or 2, wherein said jacket comprises a tub for collecting the oil/extraction agent mixture discharged from said pressing body.

4. The device according to claim 1 or 2, further comprising a tub for collecting the oil/extraction agent mixture discharged from said pressing body and wherein said tub is provided with an outlet for said oil/extraction agent mixture, said outlet being connected to a pressure vessel through a gasproof and pressure-proof connection.

5. A process for the production of oils by pressing and extracting a raw material of plant origin containing oleiferous or extractable substances in the presence of a liquid extraction agent, wherein an oil or extractable substances/extraction agent mixture is obtained wherefrom said extraction agent is removed, comprising the steps of:

shredding and pressing said raw material using a device according to claim 1 or 2 and simultaneously introducing said extraction agent under pressure into said raw material subjected to pressing.

6. The process according to claim 5, further comprising the step of employing carbon dioxide in liquefied state and/or in supercritical state or a hydrocarbon in liquid or supercritical state as said liquid extraction agent.

7. The process according to claim 5, further comprising the step of treating said shredded raw material with an oil-dissolving liquid prior to pressing.

8. A process for the production of fatty acid esters using the device according to claim 1 or 2 by transesterification of a triglyceride contained in said oleiferous raw material of plant origin with an alcohol in the presence of a catalyst, comprising the steps of:

shredding said triglyceride-containing raw material;

introducing said shredded raw material into said pressing body;

introducing the alcohol and the catalyst through outlets provided in at least one of said press screw and said pressing body into said raw material under such conditions that said triglyceride contained in said raw material is transesterified with said alcohol, fatty acid ester being produced which is discharged from said pressing body through said outlets; and purifying said fatty acid ester.

9. The device according to claim 1, wherein said means for introducing said extraction agent into said pressing body are outlets provided in said pressing body, wherethrough a liquid extraction agent may be introduced under pressure into said raw material present in said pressing body.

* * * * *

UNITED STATES PATENT AND TRADEMARK OFFICE

CERTIFICATE OF CORRECTION

PATENT NO. : 5,939,571
DATED : August 17, 1999
INVENTOR(S) : Nikolaus Foidl

It is certified that error appears in the above-identified patent and that said Letters Patent is hereby corrected as shown below:

Change item [73] from "Assignee: Sucher & Holzer Bauplanungs– und, Graz, Austria" to --Assignee: Sucher & Holzer Bauplanungs– und Handelsgesellschaft mbH, Graz, Austria--.

Signed and Sealed this

Second Day of October, 2001

*Attest:*

Nicholas P. Godici

NICHOLAS P. GODICI

*Attesting Officer* *Acting Director of the United States Patent and Trademark Office*